No. 807,816. PATENTED DEC. 19, 1905.
B. GEZON.
HORSE CHECKING DEVICE.
APPLICATION FILED DEC. 1, 1904.
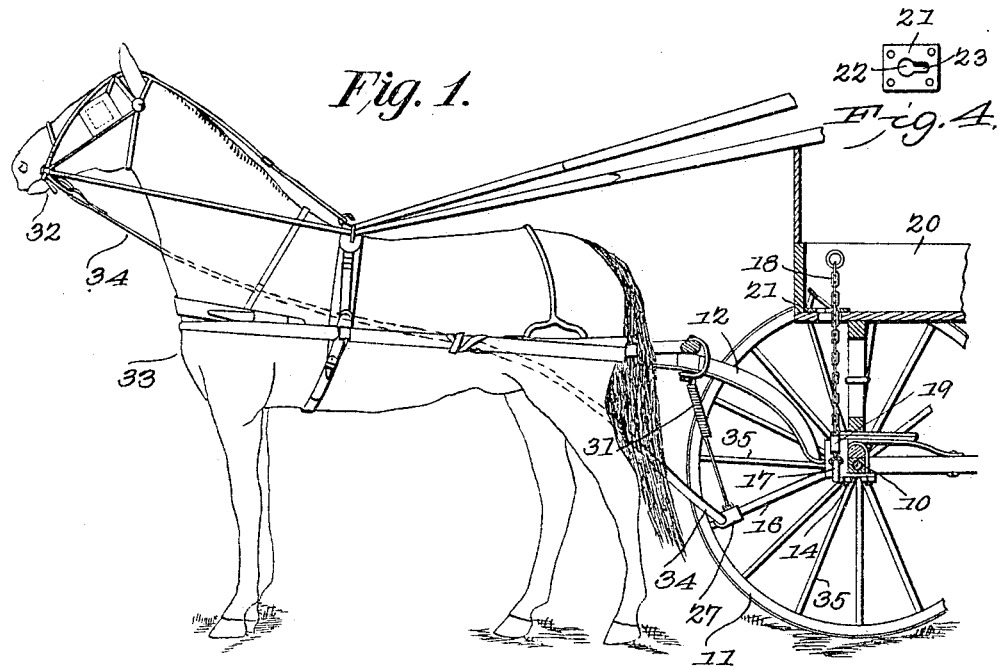
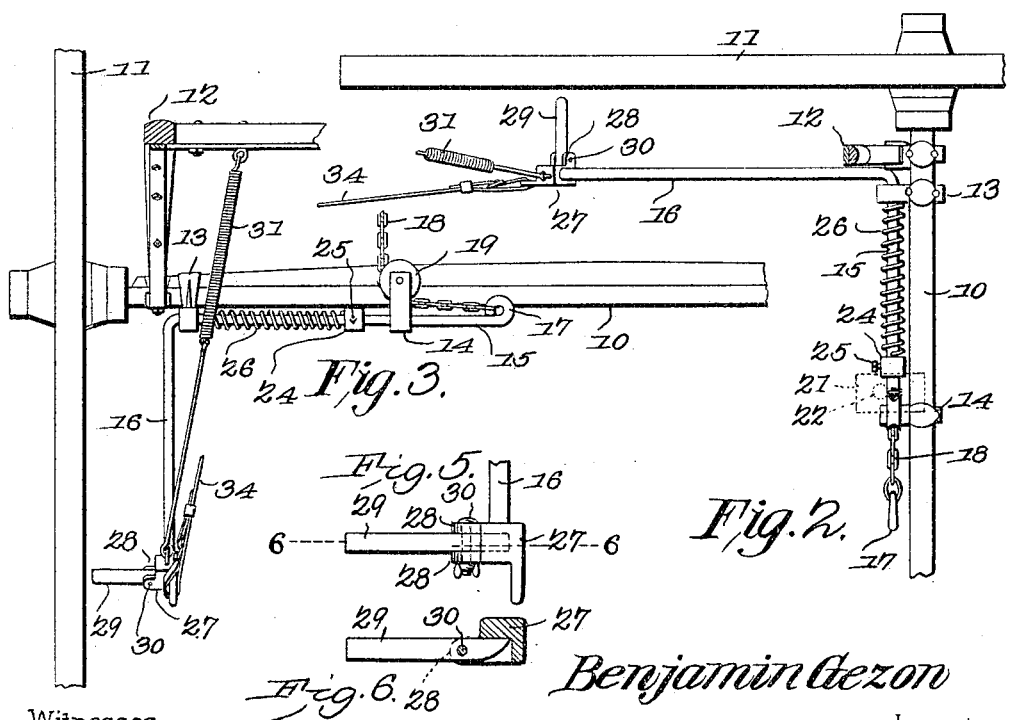
Witnesses
E. F. Stewart
C. N. Woodward
Benjamin Gezon
Inventor
by C. A. Snow & Co.
Attorneys

UNITED STATES PATENT OFFICE.

BENJAMIN GEZON, OF GRAND RAPIDS, MICHIGAN.

HORSE-CHECKING DEVICE.

No. 807,816.　　　　Specification of Letters Patent.　　　　Patented Dec. 19, 1905.

Application filed December 1, 1904. Serial No. 235,123.

*To all whom it may concern:*

Be it known that I, BENJAMIN GEZON, a citizen of the United States, residing at Grand Rapids, in the county of Kent and State of Michigan, have invented a new and useful Horse-Checking Device, of which the following is a specification.

This invention relates to means for checking fractious horses, and has for its object to provide an improved device of this character which is arranged to be readily mounted upon a vehicle under the convenient control of the driver.

Another object of the invention is to have the device actuated by one of the wheels of the vehicle to draw upon the bridle-bit in such a manner as to check the horse and at the same time operating to block the wheel against turning. In this connection it is proposed to have the device actuated under a forward movement of the wheel and to provide for tripping the device under a backward movement of the wheel, and thereby diminish the pull on the bridle-bit should the horse back the vehicle.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a side view of a horse and a portion of a vehicle in section with the improved device applied. Fig. 2 is a plan view, enlarged, of a portion of the running-gear with the improved device applied; and Fig. 3 is a front view of the same. Fig. 4 is a view of the chain-holding plate detached. Fig. 5 is an enlarged detail view of the trip member detached. Fig. 6 is a detail sectional view of Fig. 5 on the line 6 6.

The improved device is preferably applied to the forward axle (represented at 10) and operative upon one of the forward bearing-wheels 11 and also preferably supported yieldably from the thills, (represented at 12.)

The improved device consists of spaced bearing-clips 13 14, connected to the axle 10 and through which a rod 15 is mounted both for rotative and longitudinal movement, with one end of the rod turned off laterally into an arm 16 and the other end with an eye 17 to receive an operating-chain 18. The inner clip 14 is provided with a guide-pulley 19, beneath which the chain 18 leads and extends from thence upward through an aperture in the bottom of the vehicle-body 20 to a point convenient to the driver. The aperture in the vehicle-body is supplied with a guard-plate 21, likewise supplied with an aperture 22, having a contracted recess 23 extending from one side, in which the links of the chain may be engaged to hold the same at any desired point. Slidably disposed upon the rod 15 is a sleeve 24, adjustable in position thereon, as by a set-screw 25, and surrounding the rod between the sleeve and the bearing-clip 13 is a spring 26, bearing against the sleeve and maintaining the rod yieldably in its mean or withdrawn position.

Attached to the free end of the arm 16 is a head 27, having spaced ears 28, between which a trip-arm 29 is pivoted, as at 30, the trip-arm being free to swing in one direction, but held from movement in the other direction. A coiled spring 31 connects the free end of the arm 16 to the thills 12 to hold the arm and its attached trip member yieldably in its forwardly-projecting position. Connected between the free end of the arm 16 or its trip member and the bits 32 of the draft-animal (indicated at 33) is a strap or other flexible member 34.

The trip member will be so disposed that when the rod 15 is in its withdrawn position the spokes 35 of the wheel 11 will pass the member 30 without engaging the same; but if the driver draws the chain 18 upward the rod 15 will be moved longitudinally in the bearing-clips and project the member 30 into the path of the spokes of the wheel. The spring 31 will support the arm 16 in its elevated position and prevent it from bearing down upon the strap 34 and exerting a pulling force upon the bits of harness. If now the horse attempts to move forward, the first spoke forward of the member 30 will engage the same and the further forward movement be thereby effectually prevented. At the same time the rearward and downward movement of the arm 16 will cause the strap 34 to pull rearwardly upon the bits and the horse be thereby checked. If the horse should back in his efforts to release himself from the strain of the strap, no harm will result, as member 30 will yield to the rearward movement of the wheels 11, as will be obvious. When the driver is ready to release the horse and vehicle, a simple backward pull upon the chain 18 to detach it from the plate 21 is all that is necessary, as the reaction of the spring 26 will automatically restore the device to its withdrawn or inoperative position.

The parts are simple in construction, readily applicable to any of the various constructions of vehicles manufactured, and is very efficient in action and will not add materially to the weight or expense and will not increase the burden of the horse.

Having thus described the invention, what is claimed is—

1. The combination with a vehicle-axle provided with bearing-wheels and with the thills connected thereto, of a rod mounted for rotative and longitudinal movement upon said axle and having a laterally-extending arm terminating in a trip member for extension into the path of the spokes of one of said bearing-wheels, yieldable supporting means between said lateral arm and said thills, means operative by the driver for moving said rod longitudinally, and a flexible member for connection with said lateral arm and the bridle portion of the harness of the draft-animal.

2. The combination with a vehicle-axle provided with bearing-wheels, of a rod mounted for rotative and longitudinal movement upon said axle and having a laterally-extending arm terminating in a head having a trip-arm pivoted therein for projection into the path of the spokes of one of said bearing-wheels and yieldable when moved in one direction, yieldable means for supporting said rod in withdrawn position, and means under the control of the driver for moving said rod longitudinally and locking it in projected position.

In testimony that I claim the foregoing as my own I have hereto affixed my signature in the presence of two witnesses.

BENJAMIN GEZON.

Witnesses:
W. H. VAN LEEUWEN,
GEO. F. TRADEWELL.